May 1, 1956   M. BRADNER   2,743,986
INDUSTRIAL MULTI-RECORD SYSTEM
Filed Dec. 8, 1954   3 Sheets-Sheet 1
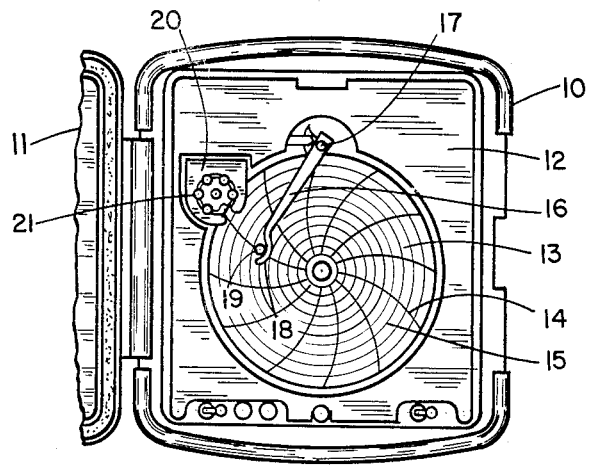
FIG. I
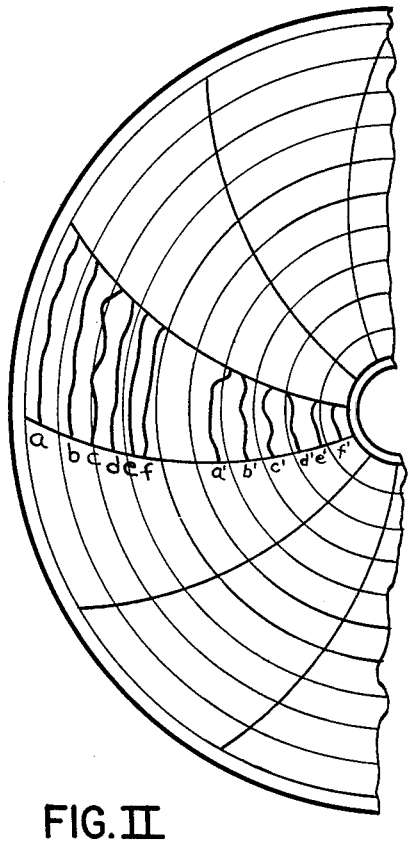
FIG. II
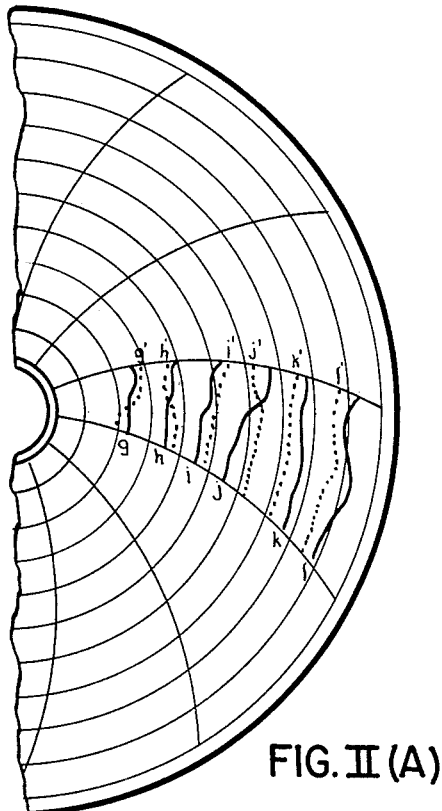
FIG. II(A)
INVENTOR.
MEAD BRADNER
BY
Lawrence H. Poeton
AGENT

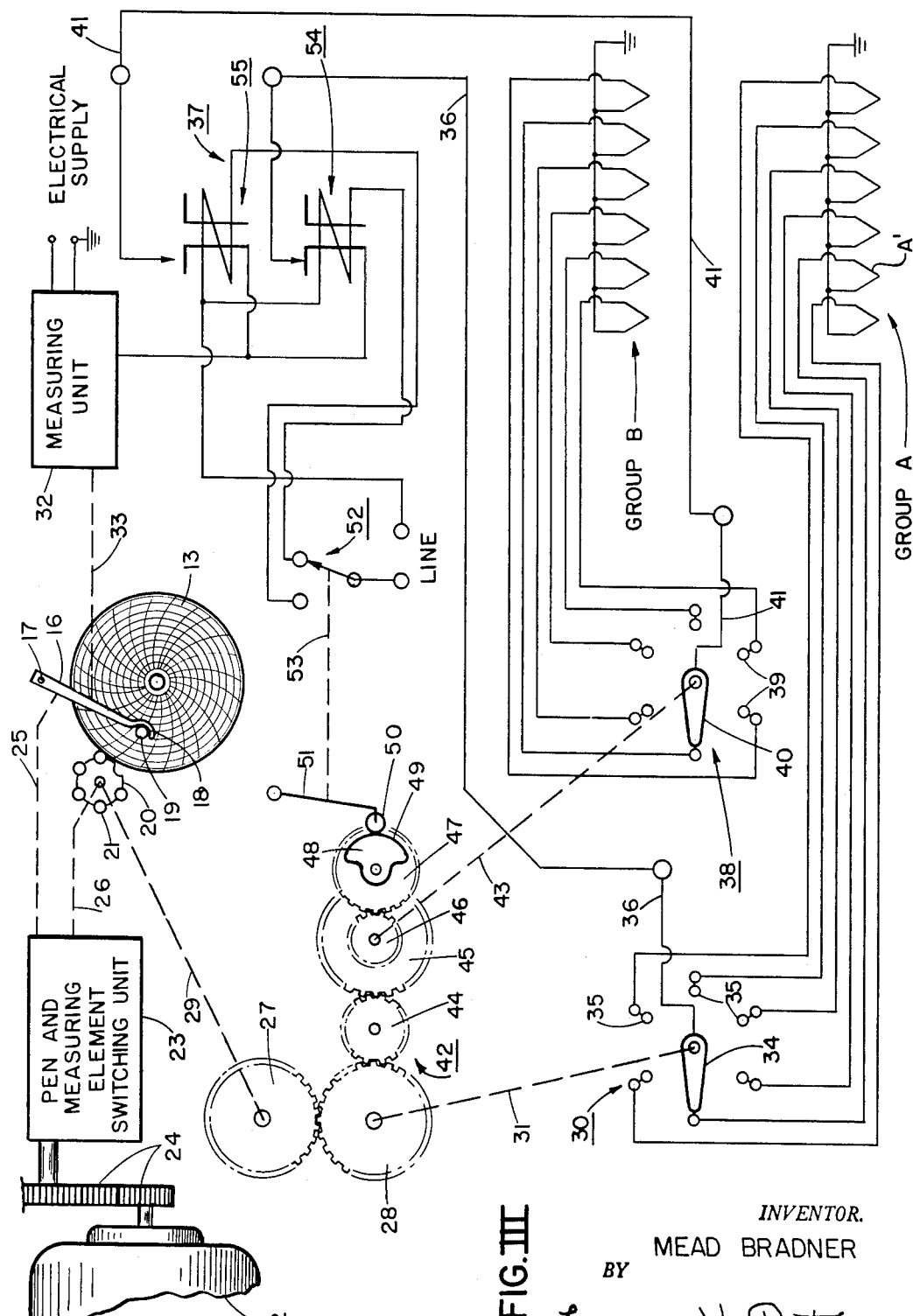
FIG. III
INVENTOR.
MEAD BRADNER

May 1, 1956 M. BRADNER 2,743,986
INDUSTRIAL MULTI-RECORD SYSTEM
Filed Dec. 8, 1954 3 Sheets-Sheet 3
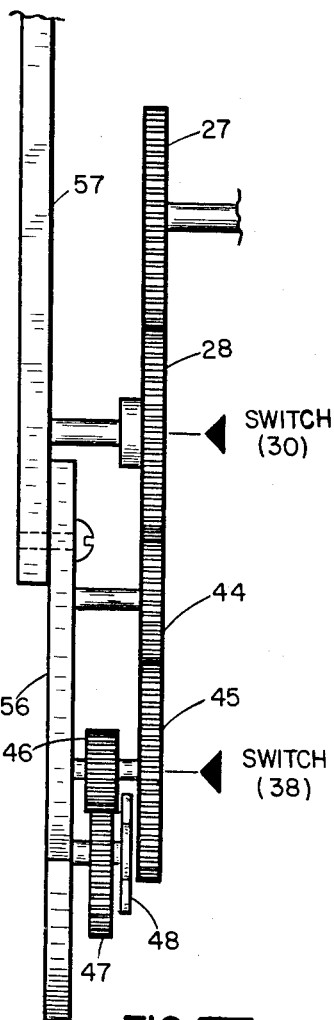
FIG. IV
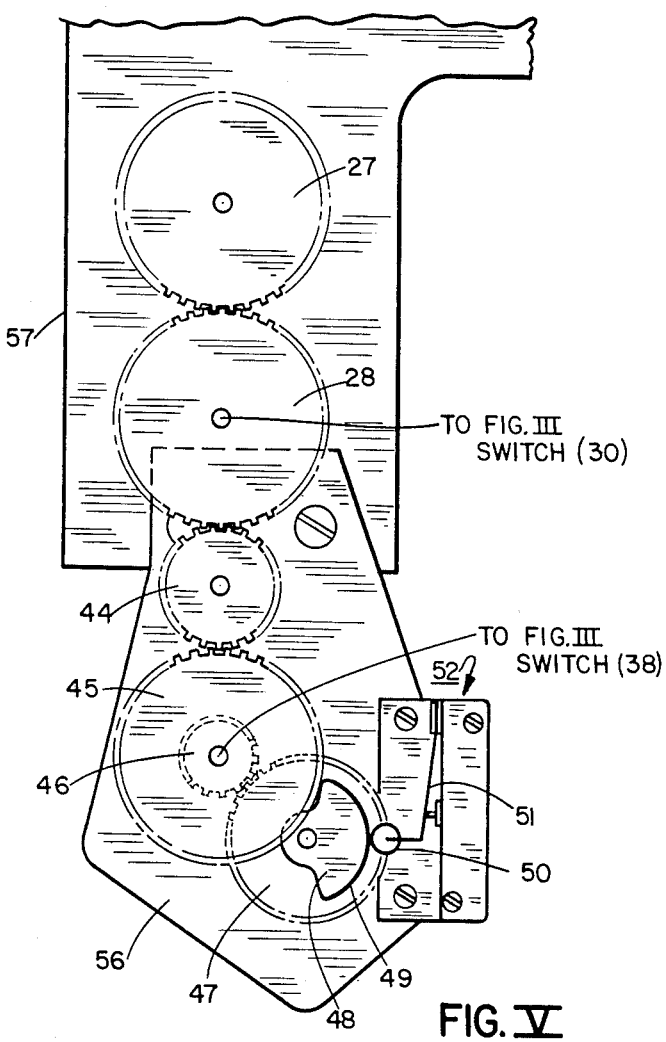
FIG. V
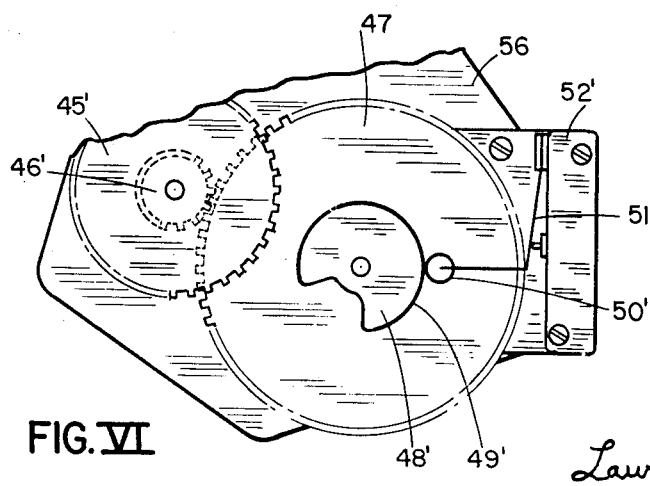
FIG. VI
INVENTOR.
MEAD BRADNER
BY
Lawrence H. Poeton
AGENT

United States Patent Office 2,743,986
Patented May 1, 1956

2,743,986

INDUSTRIAL MULTI-RECORD SYSTEM

Mead Bradner, Foxboro, Mass., assignor to The Foxboro Company, Foxboro, Mass., a corporation of Massachusetts Application December 8, 1954, Serial No. 473,959

1 Claim. (Cl. 346—46)

This invention relates to industrial recorders for producing, on round or strip charts, records of variable conditions such as, for example, temperatures, flows, pressures, etc.

Recorders for this purpose are in wide use in many branches of industry. The oil, chemical, steel, milk and many other industries are large users of such recording instruments.

It has been found desirable in many such instances to use multi-record recorders to record on a single chart the values of a number of different variables, i. e., a number of different pressures, temperatures, or flows, etc., or combinations thereof. Multi-record recorders are useful because they reduce the number of separate recording instruments otherwise required. This saves space, reduces the overall cost of the recording instrumentation, and provides at a conveniently viewable place the records of interrelated variables that for analysis or control purposes should be viewed on a single chart.

A preferred form of such multi-record recorders is disclosed in the Bowditch et al. Patent 2,674,513. The Bowditch structure incorporates a group of different recording colors, with individual pens therefor, and serially provides records from a group of variable condition measuring elements such as thermocouples. A different pen and color is provided for each of the measuring elements.

In the manufacturing of this Bowditch recorder it has been found that a general and substantial field of use is best served by providing a standard recorder, with six different colors, for multi-record use with as many as six variable condition measuring elements. In many instances, however, the particular application involves more than six variable conditions.

The present invention provides simple and economical means of multi-record recording with the Bowditch recorder, with respect to applications involving more variable conditions than there are different recording colors in this standard recorder. This invention provides, by the addition of a simple device to the standard recorder, a multi-record recorder which can effectively handle up to twice the number of variable condition measurements ordinarily handled by the standard recorder. The number six, as applied to colors and variable conditions in the standard recorder action, is intended to be illustrative only since obviously the standard recorder could be built to handle more or fewer colors and conditions. At any rate the device of this invention readily and simply increases the number of variable conditions which can effectively be handled by such a standard recorder. Old and color faded recording inks are readily usable in this device since the various records may be arranged for identification by their locations on the recorder chart as well as by color.

This invention therefore greatly increases the field in which the standard recorder may be used, by establishing a new and improved switching system in the standard recorder which provides a capability of multi-record handling of more variable condition measurements than there are different recording colors provided in the standard recorder.

An object of this invention, therefore, is to provide a new and improved switching system for a multi-record recorder.

Another object of this invention is to provide a simple and inexpensive adaptor unit for a standard multi-record recorder as a means of substantially increasing the usefulness thereof.

Other objects and advantages of this invention will be in part apparent and in part pointed out hereinafter, and in the accompanying drawings, wherein:

Figure I is a front elevation of a multi-record recorder of the type to which this invention may be applied;

Figure II is a fragmentary face view of a record chart of the type used in the recorder of Figure I, with variable condition record lines thereon, illustrating records provided by the use of this invention in one of its forms.

Figure II(A) is another chart showing, like that of Figure II, illustrating records provided by the use of this invention in another of its forms;

Figure III is a schematic showing of a switching system according to this invention;

Figures IV and V are side and elevation views respectively of a gear train adaptor unit; and Figure VI is a fragmentary view of an alternate structure, as a variation of the structure of Figure V.

Referring to Figure I, and in view of the hereinbefore mentioned Patent 2,674,513, a standard multi-record instrument is mounted in a case 10 normally closed by a cover 11 partly shown at the left. A removable round chart backing plate 12 provides backing for a conventional circular chart 13 having thereon radial time lines 14 and concentric index lines 15 in radial scale representation of values of variable conditions such as pressure, temperature, flow, etc.

A pen arm 16 is movable over the chart 13 about an axis 17 in accordance with the value of a condition being measured. The pen arm 16 carries at its free end a pen holder 18 and a pen 19, which, when the pen arm is depressed, prints a dot on the chart to record the instantaneous value of the condition being measured.

At the left of the chart is a pen magazine 20 holding five pens 21 which, with the pen 19, make a total of six available pens, each of which may carry a distinctive color. The pen arm 16 is periodically swung to the magazine 20 where a rotor in the magazine removes from the pen holder 18 the pen 19 that has just printed, and replaces it with a fresh one. The pen holder 18 is magnetized and holds its pen by magnetic force, and the magazine rotor 20 pulls the pen 19 from the holder 18 and moves another pen (21) to the holder 18. Simultaneously, through an arrangement generally shown in Figure III, switching mechanism disconnects the variable condition measuring apparatus from one measuring element and connects it to the next one. The pen arm 16 is then returned to the chart to be positioned in accordance with the variable condition value representation from the newly connected measuring element, and to be caused to print its position on the chart. The operation is continuous and rapid. For example, such a structure may record every six seconds.

Referring to Figure II, the record lines a—f and a'—f' are indicative of records made with the structure illustrated in Figure III. These lines are made by applying one dot at a time to one line at a time. In this embodiment, as will be detailed hereinafter, two groups of measuring elements are connected in one and one alternation to a common measuring circuit. Six distinctive colors are used, and the records from one group of measuring elements are shown as lines a—f, each to be of a different color. Another group of measuring elements, using the same six colors provide the record lines a'—f'. Thus a six color multi-record is made to produce distinctive records for twelve measuring elements, firstly by alternatingly connecting two groups of measuring elements, and secondly by recording the signals from the two groups distinctively on the chart, with respect to location. Since the chart is rotating, these records are appied to different rotary angle segments of the chart, and further, as shown in Figure II, one set of records, a—f, may be located in the radially outer half of the chart and the other set of records a'—f', may be located in the radially inner half of the chart.

Figure II (A) shows an alternate form of record lines as at g—l and g'—l' in representation of measurement signals from each of the two groups of measurement elements. This record arrangement is associated with the alternate cam and switch structure of Figure VI. According to this alternate form of recording arrangement, the two groups of measuring elements are serially connected in 4 and 1 alternation. One group of measuring elements is traversed by operating connection four times in a row to produce the essentially solid record lines g—l, and the other group of measuring elements is traversed by operating connection once after each four traverses of the first group, to produce the dotted record lines g'—l'. Thus a cycle of recording is in five parts, i. e., four sets of six records each from the first group of measuring elements and one set of six records from the second group of measuring elements. The records are made sufficiently fast with respect to the rotation of the record chart to give the g—l records the appearance of solid lines, while the g'—l' records appear as dotted lines since they are printed only once for every four printings on the g—l record lines. Thus for every dot in the g' line there is a solid line section of the g line which is composed of four dots.

Referring to Figure III, the multi-record system shown schematically therein is one which will produce the previously mentioned one and one alternation of the groups of measurement elements as a means of providing the Figure II alternating group record lines a—f and a'—f'.

Figure III generally indicates certain portions of the structure set forth in the Patent 2,674,513, and shows structure according to the present invention as combined with this generally indicated structure to provide an illustrative embodiment of the present invention.

The above-mentioned generally indicated structure includes a drive motor 22 for operating a pen and measuring element switching unit 23 through gears 24; and the pen arm 16 and the pen magazine 20 intermittently operable by the unit 23 through mechanical connections as indicated at 25 and 26; gears 27 and 28 rotatable in a single direction with the pen magazine 20 through a mechanical connection 29; a first rotary switch 30 operable by the gear 28 through a mechanical connection 31 to serially connect a group "A" of measuring elements, for example, thermocouples, to a measuring unit 32; and a mechanical connection 33 from the measuring unit 32 to operate the pen arm 16 in accordance with the variable condition values of the measuring elements of group "A", between the pen arm intermittent pen changing movements which are produced through the pen switching unit 23.

With the Figure III arrangement, as set forth above, in operation, the rotary switch 30 is operated step by step by the step by step single direction rotation of a switch common electrical contact arm 34. The switch 30 is provided with a circle set of six measuring element electrical contacts 35. As each contact 35 is engaged by the common contact arm 34, a different one of the group "A" measuring elements is operatively electrically connected by the switch 30 to the measuring unit 32, through a common switch output lead 36 from the common contact arm 34. Ordinarily the switch (30) output lead 36 is connected directly to the measuring unit 32, but in the present invention, as will be detailed hereinafter, the switch (30) output lead 36 is electrically connected to an electrical relay switching unit 37, which is in turn electrically connected to the measuring unit 32.

In the Figure III showing according to the present invention a second rotary switch 38 is provided, for serially electrically connecting a second, group "B" of measuring elements to the measuring unit 32 through the electrical relay switching unit 37. The second rotary switch 38 is provided with a circle set of six measuring element electrical contacts 39, and a common electrical contact arm 40 for step by step rotation to engage each of the contacts 39 in turn. In this manner the group "B" measuring elements are serially connected to the measuring unit 32 through a common switch output lead 41 from the common contact arm 40.

The second rotary switch 38 is operated from the gears 27 and 28 through a gear train 42 and a mechanical connection 43 from the gear train 42 to the common contact arm 40. The gear train 42 includes an idler gear 44 driven by the gear 28, and an intermediate gear 45 driven by the idler gear 44 and in 1 to 1 relation with the gear 28. Rotation of the intermediate gear 45 operates the mechanical connection 43 with the result that the second switch (38) common contact arm 40 is rotated.

The Figure III gear train 42 is continued through a reduced size gear 46 which is fixed to and concentric with the intermediate gear 45. The gear 46 may, for example, have eighteen teeth. A half speed gear 47 is driven by the gear 46 in a 1 to 2 ratio, the half speed gear 47 being provided with thirty-six teeth. The half speed gear 47 has a rotary cam 48 fixed thereto for rotation therewith about the axis of rotation of the gear 47. This cam (48) may be designated as a two-quadrant cam in that it has a radially extended cam face 49 extending concentrically with the gear 47 through the greater part of two quadrants. A cam follower roller 50 is arranged to ride on the cam face 49, and is mounted on a resilient arm 51 which biases the roller 50 against the cam.

The cam roller arm 51 operates an electrical switch 52 through a mechanical connection 53 as the cam follower roller 50 rides between the high and the low areas of the cam 48. Thus for one revolution of gear 46 the cam roller 50 is on the radially high section of the cam 48, and for the next revolution of gear 46 the cam roller 50 is on the low section of the cam 48.

This operation of the switch 52 controls the relay switching unit 37 to serially connect the measuring element groups A and B to the measuring unit 32. Thus, while the rotary switches 30 and 38 are constantly in step by step operation, only one such group is made effective at any one time, through the relay switching unit 37 to the measuring unit 32. Consequently at any one time only one of the measuring elements of all those in both groups A and B has any effect on the pen arm 16. In the gear train, cam, and circuit arrangements as shown in Figure III, measuring element group A is connected to the measuring unit 32, and specifically as shown, measuring element A' is the only measuring element connected to the measuring unit 32.

The Figure III relay switching unit 37 comprises a pair of relays 54 and 55, one or the other of which is energized at any one time, according to the operation of the cam switch 52. The rotary switch (30, 38) output leads 36 and 41 are connectible, respectively through the relays 54 and 55, to the measuring unit 32.

The operation of the system thus shown in Figure III accordingly results in serial connection of the measuring element groups A and B with single traverse 1 and 1 alternation to produce chart records of the character shown in Figure II at a—f and a'—f'.

Figures IV and V provide an illustration of the gearing arrangements which are schematically shown in Figure III. An embodiment of the present invention comprises an adaptor combination for use with a multi-record instrument according to the Bowditch Patent 2,674,513. This adaptor combination includes a gear train, cam, and cam switch unit as shown in Figures IV and V and as shown in Figure III, the second rotary switch 38 for use with the group "B" measuring elements and the relay switching unit 37. It is a simple matter to greatly expand the scope of usefulness of a multi-record instrument according to Patent 2,674,513 by using the adaptor combination of the present invention.

Again referring to Figures IV and V, the adaptor gear train, cam, and cam switch are mounted as a unit on an adaptor plate 56. In turn the adaptor plate is mounted on a support plate 57 which is a part of the multi-record instrument to which the adaptor combination of this invention is applied.

Figure VI illustrates an alternate structure of the present invention. With this structure, in reference to the structure of Figures IV and V, and as applied to the system of Figure III, chart records may be obtained as shown in Figure II (A) at g—l and g'—l'. The Figure VI structure is identical with that of Figures IV and V except that the relation between gears 46' and 47' is 1 to 5 with 18 and 90 teeth respectively, and the cam 48' may be called a three quadrant plus cam. With this arrangement the gear 46' revloves four times with the cam roller 50' on the radially high section of the cam 48' and thereafter revolves once with the cam roller 50' on the radially low section of the cam 48'. Accordingly, referring to Figure III, the group "A" measuring elements are serially connected repeatedly, in a quadruple traverse. Thereafter, the group "B" measuring elements are serially connected in a single traverse. In other words, the rotary switch 30 is operatively connected for four revolutions to each revolution during which the rotary switch 38 is operatively connected. Thus the measuring element groups "A" and "B" are serially connected to the measuring unit 32 in a 4 and 1 alternation. The record chart, Figure II (A), is rotating while the quadruple traverse of group "A" is being carried out in such a way that the group "A" records appear as solid lines, and the records of the group "B" measuring elements, which are separated in time by the quadruple traverses of group "A", appear as dotted lines g'—l'. The structure of this invention lends itself readily to changes in the relations of the group "A" and "B" records. By changing cams and gears or adaptor units a four and one relation may be changed to a one and one, a three and one, or to other such relations.

This invention, therefore, provides a new and useful multi-record recorder system wherein the scope of usefulness of a standard recorder is greatly enlarged, and presents an embodiment in the form of an adaptor combination for a standard multi-record recorder to provide distinctive records for many more variable conditions than there are distinctive colors available in the standard recorder. It further presents a multi-record device wherein old and color faded recording inks are readily usable since the various records may be arranged for identification by their locations on the recorder chart as well as by color.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

I claim:

For use in an industrial multi-record recorder wherein: a recording member is successively positioned over a chart to recording positions corresponding respectively with the values of variable conditions whose behaviors are to be recorded; marking means is carried by said recorder to apply color intermittently to said chart to mark thereon the successive recording positions of said recording member; color changing mechanism is provided in fixed location spaced from said chart and cooperatively associated with said marking means; an electrical switching system wherein a plurality of variable condition electrical measuring elements are automatically and serially connected to a common measuring circuit, said system comprising, in combination, a gear train assembly comprising a first gear driven by said color changing mechanism, a second gear driven by said first gear and in one-to-one relation therewith, a third, idler gear driven by said second gear, a fourth gear driven by said idler gear and in one-to-one relation with said second gear, a fifth gear, smaller than and unitary with said fourth gear, a sixth gear driven by said fifth gear and in speed step-down relation therewith, a cam which is operated by said fifth gear and formed in reduced relation to a full circle in accordance with said step-down relation of said fifth gear, and an electrical switch operable by said cam, a pair of multi-contact switches one of which is operated by said second gear and the other of which is operated by said fourth gear, with the contacts of one of said switches provided as switch connection points for one group of electrical measuring elements, and the contacts of the other of said multi-contact switches provided as switch connection points for another group of said electrical elements, a switch output connection for each of said multi-contact switches, means associated with each of said multi-contact switches for automatically and serially connecting the contacts thereof with the said output connection therefor, an output circuit common to said switches, means including said cam for automatically and serially connecting said multi-contact switch output connections to said common output circuit, and means for operatively connecting said output circuit and said recording member whereby said chart is provided with more distinguishable records than there are different colors provided.

References Cited in the file of this patent

UNITED STATES PATENTS

| | | |
|---|---|---|
| 1,422,920 | Brown et al. | July 18, 1922 |
| 1,564,558 | Grisdale | Dec. 8, 1925 |
| 2,445,272 | Keegan | July 13, 1948 |
| 2,579,831 | Keinath | Dec. 25, 1951 |
| 2,674,513 | Bowditch et al. | Apr. 6, 1954 |